United States Patent

Fuchs, Jr.

[11] 3,756,061
[45] Sept. 4, 1973

[54] METHOD OF PREFORMING MATERIALS WHICH WORK-HARDEN

[75] Inventor: Francis Joseph Fuchs, Jr., Princeton Junction, N.J.

[73] Assignee: Western Electric Company, New York, N.Y.

[22] Filed: Sept. 10, 1968

[21] Appl. No.: 758,732

[52] U.S. Cl. .................................................. 72/253
[51] Int. Cl. ............................................... B21c 5/00
[58] Field of Search ..................... 72/253, 256, 343, 72/344

[56] References Cited
UNITED STATES PATENTS

| | | | |
|---|---|---|---|
| 2,725,769 | 12/1955 | Crawford | 72/344 |
| 2,781,903 | 2/1957 | Buffet et al. | 72/256 |
| 3,144,974 | 8/1964 | Eichner et al. | 113/120 |
| 3,349,739 | 10/1967 | Griese, Jr. | 113/120 |
| 3,406,443 | 10/1968 | Ridder | 72/253 |
| 3,445,168 | 5/1969 | Zandman et al. | 356/32 |

*Primary Examiner*—Richard J. Herbst
*Attorney*—H. J. Winegar, R. P. Miller and W. M. Kain

[57] ABSTRACT

Material which work-hardens is preformed to provide the material with a work-hardening profile corresponding to that to be experienced by the material during deformation. With regard to extrusion, extrusion start-up is facilitated and non-uniform extrusion product is minimized, by providing the nose or head end of a billet or rod to be extruded with a physical shape and a work-hardening profile substantially the same as those which the rod or billet will experience in actually passing through an extrusion die under operating equilibrium conditions.

11 Claims, 4 Drawing Figures

Patented Sept. 4, 1973 3,756,061
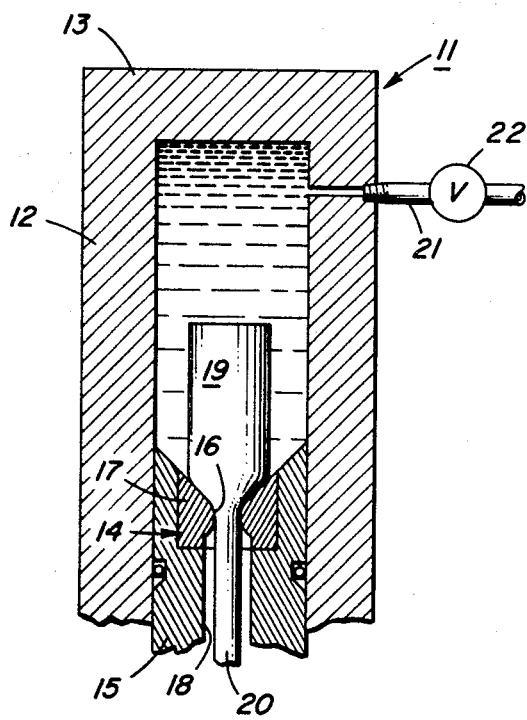
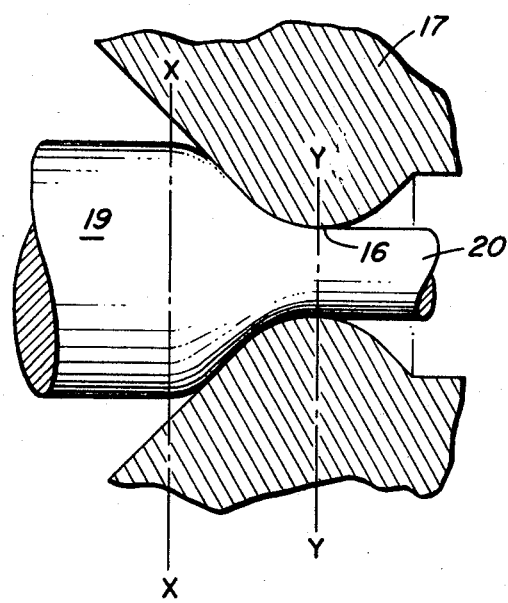
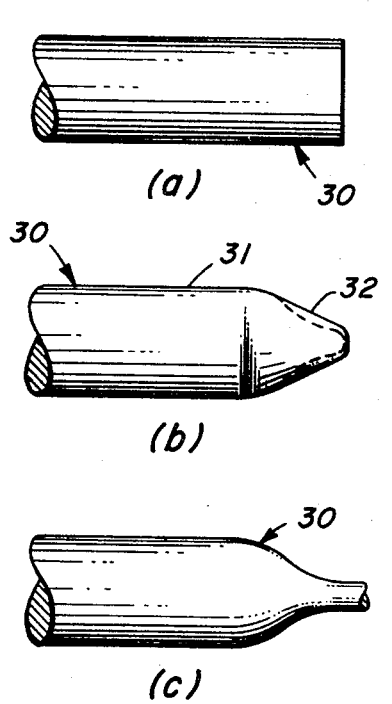
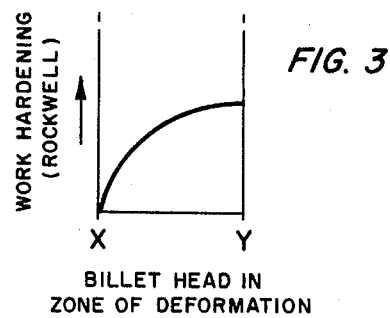
INVENTOR
F. J. FUCHS, JR.
BY MARN & JANGARATHIS
ATTORNEY 3,756,061

METHOD OF PREFORMING MATERIALS WHICH WORK-HARDEN

BACKGROUND OF THE INVENTION

Those concerned with the development of commercial extrusion techniques for extruding material, such as for example billets or rod, have long been concerned with the problem of achieving a swift and efficient start-up of the extrusion process. Heretofore, the start-up phase of a typical extrusion process has been marked by a tendency of the billet or rod material to lunge intermittently through an extrusion die, thereby causing a cyclic variation in product discharge velocity. As the process has progressed, the product discharge velocity cycling has dampened out and an operating equilibrium, characterized by a substantially even rate of product discharge, has been achieved. Such product discharge velocity cycling, however, ordinarily results in a length of extruded product which has a non-uniform cross-section, a poor surface finish, and non-uniform physical characteristics, all of which increase the likelihood of post-extrusion fracture.

Although there are applications wherein non-uniformity of shape or physical characteristics can be tolerated, for example some rods and certain types of wire, there are many others where uniformity of shape and surface conditions, and homogeneity of internal structure, are of prime importance. In the electrical art, for example, switching circuitry requires fine wire having uniform electrical characteristics which, among other considerations, are dependent upon the uniformity of wire diameter and the homogeneity of grain structure. In these cases, non-uniform product resulting from start-up lunging is unsatisfactory for use and is discarded as waste.

Where an extrusion run is relatively short and the amount of non-uniform product is relatively high in comparison with the amount of total product produced, the savings which can be achieved in time and material by eliminating or minimizing product discharge velocity cycling, or start-up lunging, are significant. Further, the elimination of start-up lunging decreases the wear on the extrusion apparatus.

Generally, the most efficient extrusion of any material occurs when an "operating equilibrium" is established in the extrusion process. The term operating equilibrium (sometimes referred to in the art as "steady state") is used herein to define, with respect to any particular extrusion process, the operating conditions which occur when a particular material is being extruded through a particular die, to be deformed into an extrusion product of desired characteristics, which product is being discharged from the extrusion die at a desired, usually constant, velocity. In other words, operating equilibrium of an extrusion process occurs when the extrusion system is in operation, start-up fluctuations have dampened out, and the system has achieved a dynamic balance so as to produce a satisfactory, uniform extrusion product. Accordingly, if an operating equilibrium can be established substantially immediately upon start-up of the extrusion process, the above-noted disadvantages of product lunging, die wear and material wastage will be substantially, if not completely, eliminated.

Thus, it has been found that as material (e.g., billet or rod) is extruded through a die when an extrusion system has established an operating equilibrium, at least two dynamic phenomena are present with regard to the material as it passes through the zone of deformation of the die, viz. (a) the material experiences a progressive change of physical configuration, and (b) the material experiences progressive work hardening which is characterized by an increasing work-hardening profile along the material as it enters and passes through the zone of deformation. Both the change in physical configuration and work-hardening profile are characteristics which, although resulting from dynamic conditions, will be permanently established in the material passing through the zone of deformation if the extrusion process is halted or interrupted in process. In restatement, if an extrusion process is interrupted during the extrusion of material under operating equilibrium conditions, the material in the die zone of deformation will retain both its changed physical configuration and its increasing work-hardening profile.

It has been found that although the progressive change of physical configuration and the work-hardening profile are dynamic characteristics, such characteristics can be duplicated, or substantially duplicated, under static conditions. Further it has been found that if the nose or head end of material to be extruded is preformed (prior to extrusion), so as to preestablish these characteristics, the above-described undesirable product discharge velocity cycling can be minimized or substantially eliminated.

In the past, such cycling or lunging during extrusion start-up was accepted as being unavoidable, notwithstanding the known practice of physically preparing, by tapering or otherwise, the head end of the billet or rod material for ease of initial insertion into the die. The present invention, however, recognizes that mere tapering operations and the like do not satisfactorily duplicate billet or rod conditions experienced during extrusion operating equilibrium, viz., the billet configuration and work-hardening profile, and as such, do not result in any significant reduction in product discharge velocity cycling.

SUMMARY OF THE INVENTION

The present invention teaches a novel method of preforming material which work-hardens with a work-hardening profile corresponding to that to be experienced by the material during deformation; in partcular, the present invention teaches a novel method of providing the nose or head end of a billet or rod to be extruded with a work-hardening profile substantially the same as that of like material undergoing extrusion in the operating equilibrium condition of an extrusion process. Further, the present invention teaches the preforming of the nose or head end of material, e.g., billet or rod, to provide the material with both the aforementioned work-hardening profile and a physical configuration corresponding to that to be experienced by the material during deformation, e.g., during an extrusion process.

BRIEF DESCRIPTION OF THE DRAWINGS

The exact nature of the present invention as well as its many advantages will be more readily understood by a consideration of the following detailed description thereof, when read in the light of the annexed drawings, wherein:

FIG. 1 is a front-elevational, cross-sectional view of a typical hydrostatic extrusion apparatus;

FIG. 2 is a partial view of a billet passing through the extrusion die of the apparatus of FIG. 1;

FIG. 3 is a diagrammatic presentation of a general work-hardening profile representing the work hardening experienced along the length of the billet within the zone of deformation of the extrusion die of the apparatus of FIGS. 1 and 2 in the operating equilibrium condition; and FIGS. 4(a) and (b) and (c) show the head end of a rod or billet being preformed in accordance with the teaching of the present invention.

DETAILED DESCRIPTION

In order to provide a convenient background for the teaching of the present invention, consideration will be given to a typical hydrostatic extrusion process; accordingly, referring to FIG. 1, there is shown a typical hydrostatic pressure extruding apparatus of the type known to those skilled in this art. The extruding apparatus, designated generally by the reference numeral 11, comprises a pressure vessel 12 having a closed end 13 and an open end for mounting a die 14 therein. The die 14 comprises a force transmission member 15 having a die plate 17 mounted therein, the die opening 16 of the die plate being in communication with a bore 18 for allowing the passage therethrough of the extruded product. The work material is shown in billet form 19 and product form 20, above and below the extrusion die plate 17, respectively.

In the operation of the apparatus of FIG. 1, a billet of some material, such as for example copper or aluminum, is positioned in pressure vessel 12 which is thereafter filled with a suitable pressure-transmitting medium, e.g., castor oil, from a high pressure fluid source (not shown) through valve 22 and conduit 21. The fluid pressure is gradually increased and is uniformly transmitted to billet 19. As the hydrostatic pressure which is acting upon the top and the peripheral surfaces of billet 19 increases sufficiently, die plate 17 is advanced inwardly of vessel 12 and the billet begins to flow, or be extruded, through die opening 16 and is discharged as a product 20 into bore 18.

As extrusion progresses and the process reaches an operating equilibrium, the billet material passing through the zone of deformation of the die (the material between lines X—X and Y—Y of FIG. 2) at any one time is being deformed, and the deformation acts to change the physical configuration and to impart work-hardening to the material.

To determine the physical configuration and the work-hardening profile of the material in the zone of deformation, the extrusion process is halted or interrupted in process and the partially extruded billet is removed from the extruding apparatus. The physical configuration of the billet material in the zone of deformation at the time the extrusion process was halted may be traced directly into a piece of paper resulting in a tracing such as shown in FIG. 4(c); or a micrometer caliper may be used to measure the billet material diameters at numerous points therealong, and the results may then be recorded on suitable graph paper for permanent recordation.

The work-hardening profile of the billet material formerly in the zone of deformation may be determined by making hardness tests at numerous points along the diameters of the billet material in the manner known to the art. For example, hardness tests which may be utilized are the well-known Vickers hardness test, and the Rockwell hardness test. The results of the hardness tests may then be plotted on suitable graph paper for permanent recordation; such results being indicated diagrammatically by the work-hardening profile shown in FIG. 3.

Recognizing that at least some slight variations may be present between different measurement samples of the same or like material undergoing deformation in the zone of deformation, and to otherwise obtain the well-known benefits of statistical averaging, the above-described physical configuration measurements and work-hardening tests may be repeated for numerous samples and the results averaged and plotted. Thus, for the material in the zone of deformation there is established a physical configuration [FIG. 4(c)], and a work-hardening profile (FIG. 3). Since the plot of FIG. 3 represents the amount of work-hardening in the billet material across the zone of deformation when the system is in operating equilibrium, the work-hardening profile is a representative plot of operating operating of work-hardening for all like or similar material in the established operating equilibrium, and is determinative of the desired or required work-hardening conditions to be provided during preforming of the billet, if work-hardening operating characteristics are to be preestablished in accordance with this invention.

It can be seen, therefore, that in order to eliminate or minimize start-up lunging in the apparatus of FIG. 1 by the method of the present invention, physical configuration and work-hardening operating characteristics in material to be extruded are determined and these operating characteristics are duplicated, or substantially duplicated, in the head end of the rod or billet material to be extruded. Thus, the nose or head end of the material to be extruded is preformed to correspond physically to that portion of the operating billet of sample material such as is shown in FIG. 4(c) and between lines X—X and Y—Y of FIG. 2, and is treated to exhibit a work-hardening profile substantially identical to that of the sample material shown in FIG. 3.

Generally, in accordance with the present invention, the head end of material to be deformed is provided with the desired physical configuration and work-hardening characteristics by machining or grinding material head end so as to conform generally to the desired physical configuration of like material in the zone of deformation, and to thereafter further deform or treat the material head end to impart to the intermediately deformed head end both the final desired physical configuration and the desired work-hardening profile. More specifically, and referring to FIG. 4(a), a section of billet material to be extruded, designated generally by reference numeral 30, is shown as it is received for preforming. The material is first machined or ground to an intermediate configuration such as is shown in solid lines in FIG. 4(b), which intermediate configuration comprises a body portion 31 and a head end or nose 32. The intermediate configuration of the head end 32 as shown in solid line in FIG. 4(b) will be slightly larger than the final desired configuration as shown in dashed lines in FIG. 4(b), and is established by determining the final physical configuration required, and the amount of material which must be further deformed in providing the desired work-hardening profile. Stated in other terms, the intermediate configuration of head end 32 is that configuration which, when further deformed into the desired final physical configuration, will experience work-hardening in such amounts along the length thereof so as to duplicate, or substantially duplicate, the desired work-hardening profile. After head end 32 has been machined to the intermediate configuration as shown in solid lines in FIG. 4(b), the partially preformed billet is further deformed, for example by rotary swaging. This further deformation imparts to the head end or nose of the billet material the desired final physical configuration, as shown in dashed outline in FIG. 4(b) and in solid outline in FIG. 4(c), and work-hardens the head end or nose 32 to provide a work-hardening profile thereacross which conforms, or substantially conforms, to that shown in FIG. 3.

With regard to a more specific example of the present invention, the head end or nose of the billet material of FIG. 4(a) is first machined or ground to an intermediate configuration as shown in solid outline in FIG. 4(b), which intermediate configuration is larger than the desired final physical configuration. The intermediately deformed billet head end or nose is then further deformed by insertion into a rotary swaging machine (any one of several such machines known to the art) wherein the final desired physical configuration is imparted to the billet head end or nose. Hardness tests, as described above, are then performed along the length of the finally shaped billet head end or nose, and the results of these tests are compared with the work hardening profile plot of FIG. 3. Should a portion (or portions) of the finally configured billet head end or nose be found to have less work-hardening than desired or required, the corresponding portion (or portions) will be made larger during the intermediate configuration step of subsequent preforming operations so that, in the final or rotary swaging step to impart the final configuration, that portion (or portions) will receive additional deformation which will impart thereto increased work-hardening. Conversely, should a portion (or portions) of the finally configured billet head end or nose be found to have more work-hardening than desired or required, the corresponding portion (or portions) will be made smaller during the intermediate configuration step of subsequent preforming operations, so that in the final or rotary swaging step to impart the final configuration, that portion (or portions) will receive less additional deformation which will impart thereto less work-hardening.

Thus, it will be understood that the head end or nose of a rod or a billet to be extruded can be preformed so as to be provided with both the same, or substantially the same, physical characteristics and work-hardening profile which will be experienced during operation equilibrium in an extrusion process. Such preforming allows operating equilibrium to be achieved virtually instantaneously after extrusion start-up and therefore eliminates or minimizes those problems described above which have heretofore been associated therewith.

It will be further understood, and as set forth in the introduction, that is within the contemplation or scope of the present invention to provide material which work-hardens with a predetermined work-hardening profile regardless of whether or not the final physical configuration of the preformed material is of consideration or not.

Many modifications and variations of the present invention are possible in the light of the above teachings. It is therefore to be understood, that within the scope of the appended claims, the invention may be practiced otherwise than as specifically described.

What is claimed is:

1. A method of treating an extrusion billet which comprises:
   deforming the billet prior to a subsequent extrusion to provide the billet with a nose having a work-hardening profile corresponding to that to be experienced by the billet when in operating equilibrium during said subsequent extrusion and also to provide the billet nose with a physical shape in accordance with that to be experienced by the billet when in operating equilibrium during said subsequent extrusion.

2. Extrusion method which comprises:
   treating a workpiece to be extruded to provide the workpiece with a nose having a work-hardening profile similar to that to be experienced by the workpiece when in operating equilibrium during extrusion, the treating being accomplished by deforming the billet to provide said nose, said deforming also providing the billet nose with a physical shape similar to that to be experienced by the billet when in said operating equilibrium during extrusion,
   introducing the workpiece nose into an extrusion die, and
   extruding said workpiece through the die under conditions of said operating equilibrium.

3. Method of preforming the head end of material to be extruded comprising the steps of:
   deforming the head end of the material to the general configuration to be experienced during a subsequent extrusion; and
   further deforming the said deformed head end to provide the head end of the material with a work-hardening profile corresponding to that to be experienced during said subsequent extrusion.

4. The method as claimed in claim 3 wherein the said further deforming comprises the step of swaging said deformed head end.

5. Method of preparing an elongated billet of material which work-hardens for extrusion through a die having a zone of deformation extending longitudinally therethrough between the rear entrance end of the die and the front exit end of the die, said method comprising:
   a. passing a sample billet of material similar to the material of the elongated billet into the zone of deformation of the die from the rear of said zone of deformation to the front of said zone of deformation to obtain a deformed length of progressively work-hardened sample billet equal in length to the length of the zone of deformation and corresponding in contour to the contour of the zone of deformation;
   b. determining the hardness profile of said deformed length of sample billet longitudinally of said deformed length;
   c. thereafter, hardening the nose end of said elongated billet along a length equal to the length of the zone of deformation sufficiently to impart longitudinally thereto a hardness profile corresponding to the said hardness profile of the said deformed length of sample billet and imparting to the nose end of said elongated billet a contour corresponding to the contour of the zone of deformation.

6. Method as in claim 5, comprising:
d. performing step (c) by deforming the nose end of said elongated billet by means other than said die.

7. Method as in claim 5, comprising:
d. performing step (c) by swaging the nose end of said elongated billet.

8. Method as in claim 5, said method further comprising:
d. prior to step (c), providing the nose end of said elongated billet along a length equal to the length of the zone of deformation with a contour intermediate the original contour of said nose end and the contour of the zone of deformation.

9. Method as in claim 8, comprising:
e. performing step (d) by removing material from the nose end of said billet.

10. Method as in claim 5, said method further comprising:
d. subsequent to step (c), introducing the nose end of the prepared elongated billet into the entrance end of said die and extruding said prepared elongated billet.

11. Method as in claim 9, said method further comprising:
f. subsequent to step (d), introducing the nose end of the prepared elongated billet into the entrance end of said die and extruding said prepared elongated billet.

* * * * *

L-566-PT
(6-69)

UNITED STATES PATENT OFFICE
CERTIFICATE OF CORRECTION

Patent No. 3,756,061      Dated September 4, 1973

Inventor(s) FRANCIS JOSEPH FUCHS, JR.

It is certified that error appears in the above-identified patent and that said Letters Patent are hereby corrected as shown below:

Cover page, "Attorney - H. J. Winegar, R. P. Miller and W. M. Kain" should be --Attorney - J. Schuman--.

Column 1, lines 46-47, "operating equilibrium" should be --"operating equilibrium"--; lines 54-55, "operating equilibrium" should be --"operating equilibrium"--. Column 2, 46, "partcular" should be --particular--. Column 4, line 17, "proflle" should be --profile--; line 21, "operJing operating" should be --operating values--; line 60, "line" should be --lines--. Column 5, line 61, "that is" should be --that it is--.

Signed and sealed this 22nd day of January 1974.

(SEAL)
Attest:

EDWARD M. FLETCHER, JR.
Attesting Officer

RENE D. TEGTMEYER
Acting Commissioner of Paten